Dec. 5, 1933.       R. R. SEARLES       1,938,356
CHUCK
Filed March 10, 1931       2 Sheets-Sheet 1
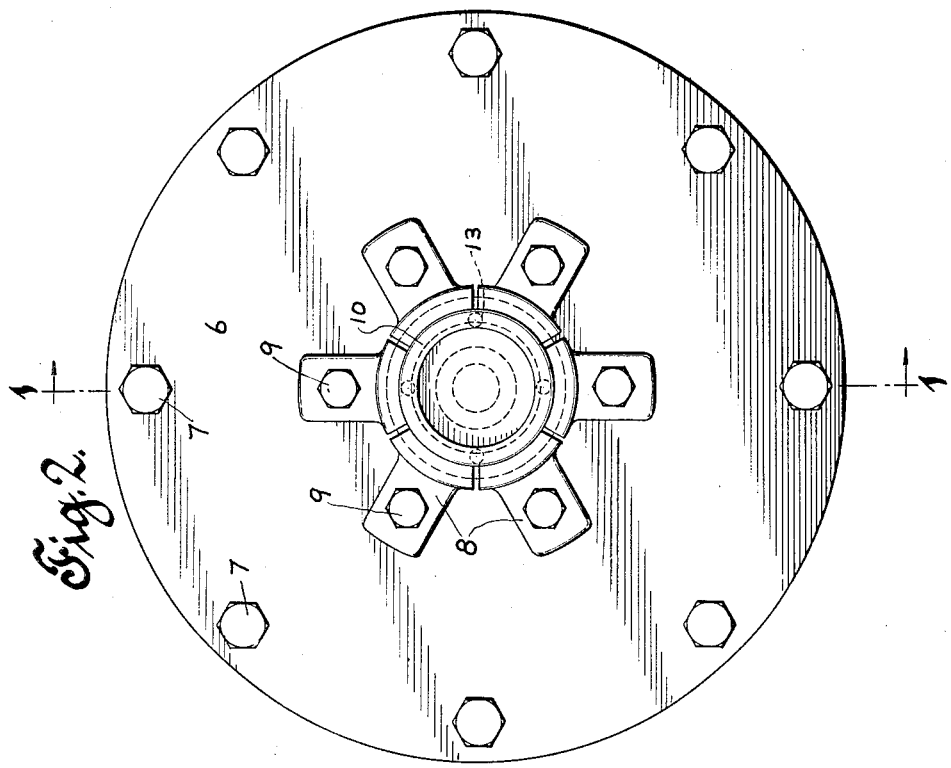
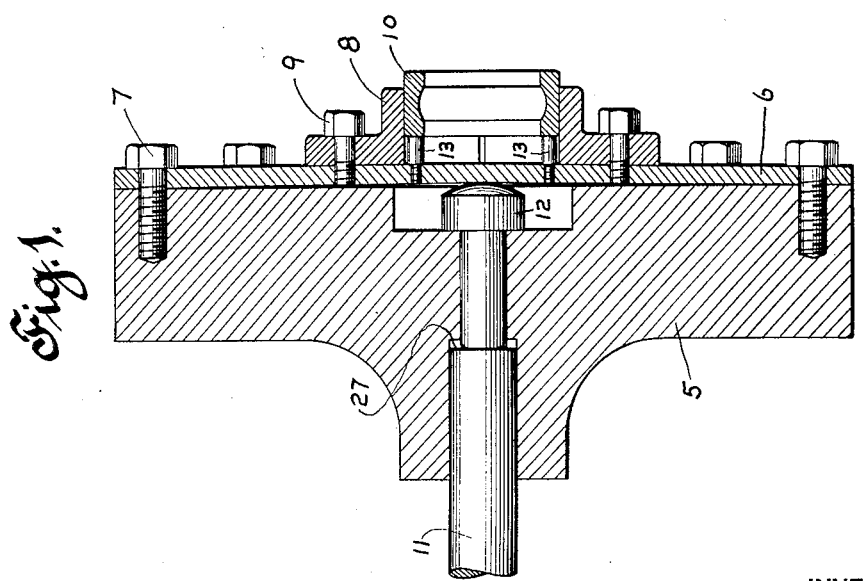
INVENTOR
Raymond R. Searles
BY
Mitchell & Bechert
ATTORNEY Dec. 5, 1933.  R. R. SEARLES  1,938,356
CHUCK
Filed March 10, 1931  2 Sheets-Sheet 2
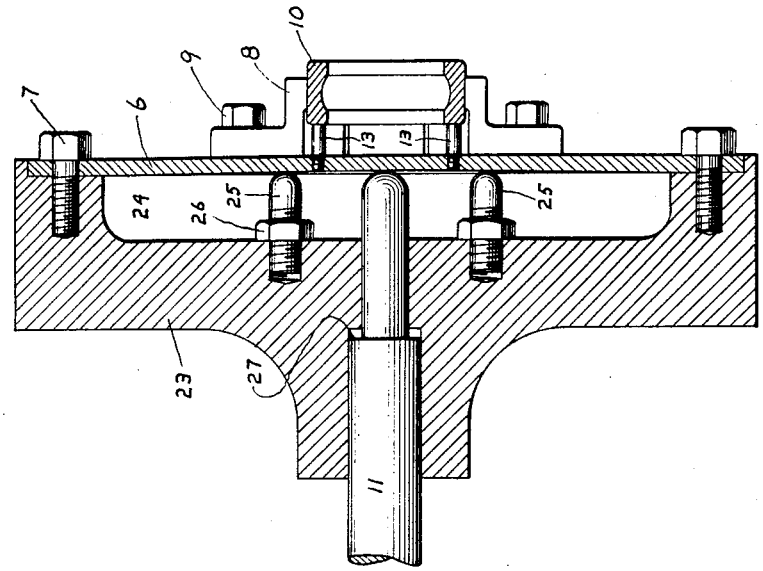
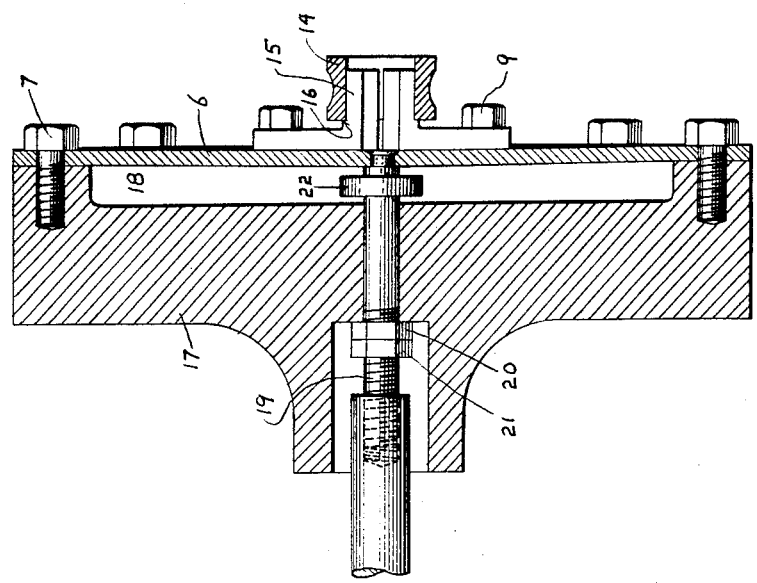
INVENTOR
Raymond R. Searles
BY
Mitchell & Bechert
ATTORNEY Patented Dec. 5, 1933

1,938,356

UNITED STATES PATENT OFFICE 1,938,356

CHUCK

Raymond R. Searles, New Britain, Conn., assignor to The Fafnir Bearing Company, New Britain, Conn., a corporation of Connecticut Application March 10, 1931. Serial No. 521,404

5 Claims. (Cl. 279—46)

My invention relates to a diaphragm chuck, and more particularly to certain improvements in a chuck of the type disclosed in Scaife Patent No. 1,389,272, dated August 30, 1921.

Said Scaife patent is subject to the disadvantage that the work stops are carried by a movable part of the diaphragm so that they are moved whenever the diaphragm is flexed in the course of chucking and unchucking operations. Thus, in gripping objects of different sizes, such objects, being in contact with the work stops, will not always be in the same position for the action of the tool.

It is the principal object of my invention to provide a diaphragm chuck so arranged that work pieces of substantially uniform size can be held in predetermined position for the action of the cutting, abrading, or polishing tool, regardless of small variations in the size of such work pieces.

This object I accomplish by providing a diaphragm chuck having a positive stop for positioning the diaphragm and the work stops carried by the diaphragm so that the work pieces will always be in substantially the same position relative to the tool regardless of slight variations in the size of the work pieces.

It is a further object of my invention to provide a diaphragm chuck in which the diaphragm is at all times under flexure whereby there will always be a powerful elastic force present tending to bring the same back to the same point.

Other objects and features of invention will hereinafter appear.

In the drawings which show, for illustrative purposes only, preferred forms of the invention—

Fig. 1 is a sectional view on the line 1—1 of Fig. 2 of a chuck illustrating features of my invention;

Fig. 2 is a front view in elevation of the chuck shown in Fig. 1;

Fig. 3 is a sectional view of a chuck showing a modified arrangement for springing the chuck and actuating the jaws and a modified form of diaphragm stop;

Fig. 4 is a sectional view of a chuck showing a further modification.

In said drawings, 5 indicates a chuck body or face-plate. A diaphragm 6, which is preferably made of strongly resilient material, is secured to the chuck body, preferably at the periphery of the diaphragm. In the forms shown in the drawings, a series of cap screws 7—7 extend through the diaphragm and are threaded into the face-place 5. The diaphragm carries chuck jaws 8—8 which, as shown, may be separate members attached to the diaphragm, as by cap screws 9—9. The jaws herein disclosed are shaped for gripping a ball bearing ring 10.

For the particular chuck arrangement shown in Figs. 1 and 2 the diaphragm is arranged to be flexed by a push rod 11, to be actuated in any suitable manner. The push rod 11 has a stop 12 at its front end which coacts with a bearing surface on the chuck body 5 and with the diaphragm 6 so that the diaphragm may be kept partially flexed at all times. It will be seen that upon movement of the push rod 11 to the right in Fig. 1, the tension of the diaphragm will be increased and the chuck jaws 8—8 will be moved radially outward. Thereafter, upon moving the push rod 11 to the left, the diaphragm will spring back, and in so doing cause the jaws 8—8 to grip the work piece, such as the bearing ring 10. The rod 11 may be provided with another stop 27 which coacts with a shoulder on the chuck body 5 to prevent undue flexure of the diaphragm and for another purpose which will be hereinafter described.

In order to locate the work piece 10 longitudinally, I provide work stop means carried by the diaphragm and extending into proper position to act as locating stops for such work piece. In the form shown in Figs. 1 and 2, the work stop means are the pins 13—13.

By means of the stop 12, I insure that when the chuck is used for external gripping the work pieces will always be stopped and held in the correct working position relative to the working tool regardless of slight variations in the size of the work pieces. If the stop 12 were not provided, an undersize work piece would be positioned further to the left than its normal position when it is gripped by the jaws 8. The stop 12, however, limits the motion of the diaphragm 6 to the left so that the work piece is carried only to its normal position. The exterior of the work piece being slightly undersize, the work piece will not, of course, be held so strongly by the jaws 8 under this arrangement as it would be held if it were of normal size. On the other hand, if the work piece be slightly oversize, it will be contacted by the jaws 8 before they have moved far enough to the left to properly position the work piece. Nevertheless the elastic force of the diaphragm 6 is so great that the diaphragm will move further to the left until it coacts with the stop 12, thus bringing the work piece to its normal position. This is facilitated by a slight springiness in the jaws 8, and as a result the work piece is gripped with more than normal pressure. Of course, such functioning would be impossible if the work piece were substantially oversize, and such a work piece would be discarded.

Fig. 3 shows a modification in which a work piece 14 is gripped internally for external machining, abrading, or polishing operations. Chuck jaws 15 are provided with stop means such as the shoulders 16 against which the work piece abuts. The front end of the chuck body 17 is recessed at 18 so as to permit the diaphragm 6 to be flexed to the left. The actuating rod 19 is attached to the diaphragm 6 by any convenient means. In the form shown, the front end of the rod 19 is riveted into a countersunk hole in the diaphragm. The rod 19 has stop means thereon which coact with the chuck body 17 so that the diaphragm 6 may be kept slightly flexed to the left at all times. In the form shown, the rod 19 is threaded, and the stop means consists of a nut 20 which is threaded on the rod and which abuts against the chuck body 17. A lock nut 21 is also threaded on the rod 19 behind the nut 20. The rod 19 may also carry a collar 22 near its front end which coacts with the body 17 to prevent undue flexure of the diaphragm 6.

By means of the stop means 20, I insure that the work pieces will always be in substantially the same position relative to the tool regardless of slight variations in the size of the work pieces. If a work piece is oversize, the movement of the diaphragm 6 to the right will be checked when the stop 20 comes in contact with the chuck body 17. The work piece will then be in the correct position to be operated on. Since the work piece is oversize, it will not be gripped as tightly as it would be if it were of normal size. If it is substantially oversize, it will not be gripped at all and must be discarded. If the work piece is undersize, it will be contacted by the jaws 15 before the jaws 15 have moved far enough to the right to properly position the work piece for the subsequent operation. Either the elastic force of the diaphragm 6 or pressure applied to the rod 19 will then come into play to force the work piece further to the right until the stop 20 contacts with the chuck body 17. There is sufficient springiness in the jaws 15 to enable this to be done. The work piece is then in correct position for the operations to be performed upon it. Of course, if the work piece is substantially undersize, it cannot be forced to the correct position and must be discarded.

The chuck shown in Fig. 3 can also be used for internal grinding or machining operations by providing it with suitable chuck jaws for externally gripping the work piece. In such case, movement of the diaphragm to the left will cause the jaws to grip the work piece, and the collar 22 will act as a stop for properly positioning the diaphragm and work piece. When the diaphragm and work piece have moved far enough to the left to properly position the work piece for subsequent operations, the collar 22 will come in contact with the chuck body 17 and will perform the same functions that the stop 20 performs when the chuck is used for external machining or grinding operations.

The chuck shown in Fig. 4 is similar to the chuck shown in Figs. 1 and 2, except that the rod 11 is not provided with a stop at its front end such as shown at 12 in Fig. 1. Instead, the chuck body 23 is recessed at 24, and in this recess and attached to the chuck body is placed suitable stop means for properly positioning the diaphragm and work piece. In the particular form shown, I have provided a plurality of adjustable pins 25 which are threaded into the chuck body 23 and are provided with lock nuts 26. This chuck will function in the same manner as the chuck shown in Figs. 1 and 2.

It should be understood that the chuck shown in Fig. 4 can be arranged so that the chuck jaws can be actuated by external force to grip the work. For instance, the front end of the rod 11 could be attached to the diaphragm 6 and the rod could be moved to the left to move the jaws 8 into contact with the work piece and to move the diaphragm to the left until it reaches the position in which it will be stopped by the stops 25. In such case, the release of the work piece can be accomplished by moving the rod 11 to the right, or by merely releasing the rod so as to permit the elasticity of the diaphragm to assert itself to move the diaphragm to the right.

Again, the chucks shown in Figs. 1 and 4 can be used for external grinding or machining operations by providing them with suitable chuck jaws for internally gripping the work piece. When the diaphragm and work piece have been moved enough to the right by external force applied to the rod 11 to properly position the work piece, the stop 27 will coact with the chuck body to stop further movement.

While preferred forms of the invention have been described in detail, it is to be understood that various changes and modifications may be made within the scope of the invention as defined in the appended claims.

I claim:

1. In a diaphragm chuck, a chuck body, a diaphragm secured to said body, chuck jaws carried by said diaphragm, means for flexing said diaphragm for moving said jaws, and a plurality of adjustable pins threaded into said chuck body for limiting the axial motion of said diaphragm in one direction.

2. In a diaphragm chuck, a chuck body, a diaphragm secured to said body so as to be constantly flexed, jaws carried thereby, means for moving said diaphragm in one direction so as to increase the flexure of said diaphragm to move said jaws, and a plurality of adjustable pins threaded into said body for limiting the axial motion of said diaphragm in the opposite direction.

3. In a diaphragm chuck, a chuck body, a diaphragm secured to said body, chuck jaws carried by said diaphragm, means for flexing said diaphragm for moving said jaws, and adjustable means secured to said body for limiting the axial motion of said diaphragm in one direction.

4. In a diaphragm chuck, a chuck body member, a diaphragm member secured to said body member, chuck jaws carried by said diaphragm member, means for flexing said diaphragm member for moving said jaws, and stop means adjustably carried by one of said members and positioned to abut the other of said members for stopping said diaphragm at a predetermined point.

5. In a diaphragm chuck, a chuck body member, a diaphragm member secured to said body member, chuck jaws carried by said diaphragm member, means for flexing said diaphragm member for moving said jaws, and stop pins carried by one of said members and positioned to abut the other of said members for stopping said diaphragm at a predetermined point.

RAYMOND R. SEARLES.